(12) United States Patent
Zatz

(10) Patent No.: US 6,806,886 B1
(45) Date of Patent: Oct. 19, 2004

(54) SYSTEM, METHOD AND ARTICLE OF MANUFACTURE FOR CONVERTING COLOR DATA INTO FLOATING POINT NUMBERS IN A COMPUTER GRAPHICS PIPELINE

(75) Inventor: Harold Robert Feldman Zatz, Mountain View, CA (US)

(73) Assignee: nVidia Corporation, Santa Clara, CA (US)

(*) Notice: Subject to any disclaimer, the term of this patent is extended or adjusted under 35 U.S.C. 154(b) by 430 days.

(21) Appl. No.: 09/610,706

(22) Filed: Jul. 7, 2000

Related U.S. Application Data

(63) Continuation-in-part of application No. 09/585,809, filed on May 31, 2000, now Pat. No. 6,532,013.

(51) Int. Cl.[7] .................................................. G09G 5/00
(52) U.S. Cl. ...................... 345/582; 345/586; 345/588; 345/589; 345/606; 382/254
(58) Field of Search ................................ 345/582–589, 345/606; 382/254

(56) References Cited

U.S. PATENT DOCUMENTS

| | | | | |
|---|---|---|---|---|
| 5,313,231 A | * | 5/1994 | Yin et al. | 345/605 |
| 5,694,143 A | | 12/1997 | Fielder et al. | 345/112 |
| 5,798,770 A | | 8/1998 | Baldwin | 345/506 |
| 5,815,166 A | * | 9/1998 | Baldwin | 345/552 |
| 5,838,337 A | | 11/1998 | Kimura et al. | 345/519 |
| 5,856,831 A | * | 1/1999 | Scott et al. | 345/503 |
| 5,977,997 A | | 11/1999 | Vainsencher | 345/519 |
| 5,995,122 A | * | 11/1999 | Hsieh et al. | 345/561 |
| 6,000,027 A | | 12/1999 | Pawate et al. | 712/39 |
| 6,057,850 A | * | 5/2000 | Kichury | 345/584 |
| 6,268,863 B1 | * | 7/2001 | Rioux | 345/427 |
| 6,292,815 B1 | * | 9/2001 | Abdallah et al. | 708/204 |
| 6,304,300 B1 | * | 10/2001 | Warren et al. | 348/674 |
| H2003 H | * | 11/2001 | Minner | 382/254 |
| 6,340,974 B1 | * | 1/2002 | Nagashima | 345/584 |
| 6,392,655 B1 | * | 5/2002 | Migdal et al. | 345/582 |
| 6,434,276 B2 | * | 8/2002 | Hirosawa et al. | 382/284 |

FOREIGN PATENT DOCUMENTS

| | | | | |
|---|---|---|---|---|
| EP | 0690430 A2 | 1/1996 | | G09G/1/16 |
| WO | WO 98/28695 | 7/1998 | | G06F/15/16 |
| WO | WO 99/52040 | 10/1999 | | G06F/15/76 |

OTHER PUBLICATIONS

Marc Olano and Trey Greer; "Triangle Scan Conversion using 2D Homogeneous Coordinates"; 1997 SIGGRAPH/Eurographics Workshop; pp 89–95.

Lance Williams; "Pyramidal Parametrics"; Jul. 1983; Computer Graphics, vol. 17. No. 3 Computer Graphics Laboratory, New York Institute of Technology, Old Westbury, N.Y.; pp 1–11.

James F. Blinn et al., "Texture and Reflection in Computer Generated Images"; Oct. 1976; Graphics and Image Processing; Association for Computing Machinery, Inc. pp 542–547.

* cited by examiner

Primary Examiner—Matthew C. Bella
Assistant Examiner—Po Wei Chen
(74) Attorney, Agent, or Firm—Silicon Valley IP Group, PC; Kevin J. Zilka

(57) ABSTRACT

A system, method and article of manufacture are provided for converting color data into floating point values in a graphics pipeline. First, color data is received. Next, the color data is separated into a plurality of components each including an integer. The components of color data are then converted into floating point values by dividing at least a portion of the components by predetermined numbers.

14 Claims, 6 Drawing Sheets

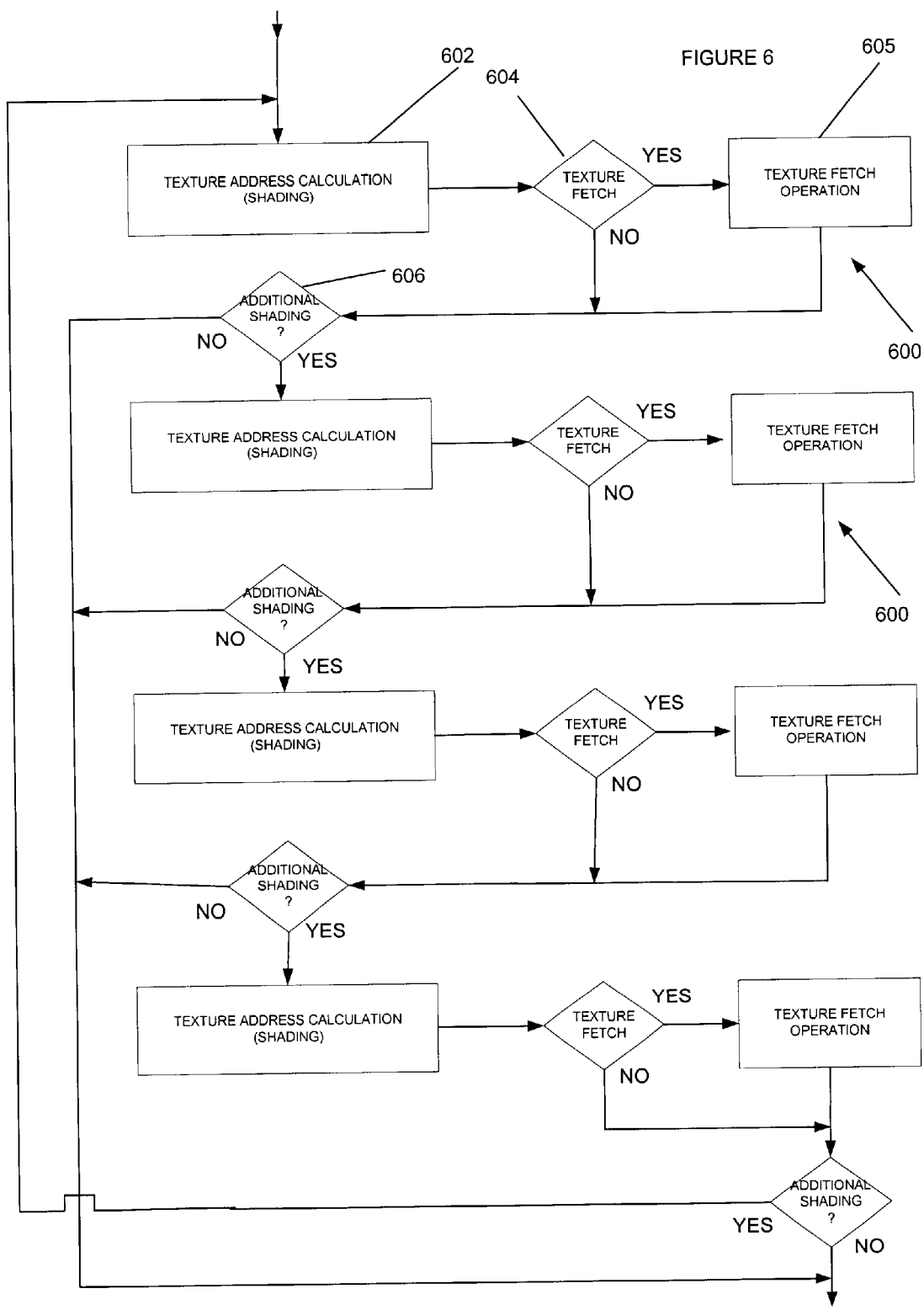

SYSTEM, METHOD AND ARTICLE OF MANUFACTURE FOR CONVERTING COLOR DATA INTO FLOATING POINT NUMBERS IN A COMPUTER GRAPHICS PIPELINE

RELATED APPLICATION(S)

This application is a continuation-in-part application of a application entitled "SYSTEM, METHOD AND ARTICLE OF MANUFACTURE FOR PIXEL SHADERS FOR PROGRAMMABLE SHADING" filed May 31, 2000 under Ser. No. 09/585,809 now U.S. Pat. No. 6,532,013, and which is incorporated herein by reference in its entirety. This application is also related to a co-pending application entitled "GRAPHICS PIPELINE INCLUDING COMBINER STAGES" filed Mar. 22, 1999 naming David S. Kirk, Matthew Papakipos, Shaun Ho, Walter Donovan, and Curtis Priem as inventors, and issued as U.S. Pat. No. : 6,333,744, and which is incorporated herein by reference in its entirety.

FIELD OF THE INVENTION

The present invention relates to computer graphics, and more particularly to texture sampling in a computer graphics processing pipeline.

BACKGROUND OF THE INVENTION

Recent advances in computer performance have enabled graphic systems to provide more realistic graphical images using personal computers and home video game computers. In such graphic systems, some procedure must be implemented to "render" or draw graphic primitives to the screen of the system. A "graphic primitive" is a basic component of a graphic picture, such as a polygon, e.g., a triangle, or a vector. All graphic pictures are formed with combinations of these graphic primitives. Many procedures may be utilized to perform graphic primitive rendering.

Early graphic systems displayed images representing objects having extremely smooth surfaces. That is, textures, bumps, scratches, or other surface features were not modeled. In order to improve the quality of the image, texture mapping was developed to model the complexity of real world surface images. In general, texture mapping is the mapping of an image or a function onto a surface in three dimensions. Texture mapping is a relatively efficient technique for creating the appearance of a complex image without the tedium and the high computational cost of rendering the actual three dimensional detail that might be found on a surface of an object.

Prior Art FIG. 1 illustrates a graphics pipeline with which texture mapping may be performed. As shown, included is a transform engine 100, a set-up module 102, a rasterizer 104, a texture math module 106, a level of detail (LOD) calculator 108, a texture fetch module 110, a texture filter 112, and a texture combination engine 114. It should be noted that the transform engine 100 and set-up module 102 need not necessarily be required in the graphics pipeline of a graphics integrated circuit.

During operation, the transform engine 100 may be used to perform scaling, rotation, and projection of a set of three dimensional vertices from their local or model coordinates to the two dimensional window that will be used to display the rendered object. The setup module 102 utilizes the world space coordinates provided for each triangle to determine the two dimensional coordinates at which those vertices are to appear on the two dimensional window. Prior Art FIG. 2 illustrates the coordinates 200 of the vertices 201 which define a triangle 202. If the vertices 201 of the triangle 202 are known in screen space, the pixel positions vary along scan lines within the triangle 202 in screen space and may be determined.

The setup module 102 and the rasterizer module 104 together use the three dimensional world coordinates to determine the position of each pixel contained inside each of the triangles. Prior Art FIG. 3 illustrates a plurality of pixels 300 identified within the triangle 202 in such a manner. The color values of the pixels in the triangle 202 vary from pixel to pixel in world space. During use, the setup module 102 and the rasterizer module 104 generate interpolated colors, depth and texture coordinates.

The setup module 102 and the rasterizer module 104 then feed the pixel texture coordinates to the texture math module 106 to determine the appropriate texture map colors. In particular, texture coordinates are generated that reference a texture map using texture coordinate interpolation which is commonly known to those of ordinary skill in the art. This is done for each of the pixels 300 identified in the triangle 202. Prior Art FIG. 3 illustrates texture coordinates 302 for the pixels 300 identified within the triangle 202.

Next, a LOD calculation is performed by the LOD calculator 108. Occasionally during rendering, one texel, or texture element, will correspond directly to a single pixel that is displayed on a monitor. In this situation the level of detail (LOD) is defined to be equal to zero (0) and the texel is neither magnified nor minified. However, the displayed image can be a magnified or minified representation of the texture map. If the texture map is magnified, multiple pixels will represent a single texel. A magnified texture map corresponds to a negative LOD value. If the texture map is minified, a single pixel represents multiple texels. A minified texture map corresponds to a positive LOD value. In general, the LOD value corresponds to the number of texels in the texture map 'covered' by a single pixel.

The amount of detail stored in different LOD representations may be appreciated by drawing an analogy to the detail perceived by an observer while observing a texture map. For example, very little detail may be perceived by an observer while watching an automobile from a distance. On the other hand, several details such as doors, windows, mirrors will be perceived if the observer is sufficiently close to the automobile. A finer level LOD will include such additional details, and a courser LOD will not.

Once the appropriate level of detail of the texture map is selected based on the calculated LOD value, the texture coordinates generated by the texture math module 106 are used to fetch the appropriate texture map colors using the texture fetch module 110. These texture map colors are then filtered by the texture filter module 112. The combiner engine 114 combines together the various colors and textures fetched by the texture fetch module 110 and filtered by the texture filter module 112.

It is important to note that the pipeline described hereinabove has a linear topology. These and other simplistic non-linear pipelines only enable one texture fetch and texture calculation per rendering pass. This is a limited design that is static in nature. There is thus a need for a pipeline that allows for more dynamic texture fetches and shading calculations, and in particular, the ability for feeding filter results back to influence subsequent texture address calculations.

By implementing such a modified pipeline, floating point conversions may be required while performing shading calculations. While well-known, simple techniques exist for converting integers into the standard IEEE floating point representations, such are limited and only very useful if the number being used for the floating point divisor is a power of 2 (like 256, 128, 65536, 32768) or one off from a power of 2 (like 255, 127, 65535). There is thus a need for an optimized technique of converting color data into floating point values in a graphics pipeline.

DISCLOSURE OF THE INVENTION

A system, method and article of manufacture are provided for converting color data into floating point values in a graphics pipeline. First, color data is received. Next, the color data is separated into a plurality of components each including an integer. The components of color data are then converted into floating point values by dividing at least a portion of the components by predetermined numbers.

In one embodiment, the color data is thirty-two (32) bits in length. Further, the floating point values, i.e. (d,e,f), may be used to combine the color data with a set of coordinates (r,g,b) using a dot product.

In one set of embodiments of the present invention, the components include four (4) components (A, R, G, B) each eight (8) bits in length. In a first embodiment of the first set, the components (A, R, G, B) are unsigned integers on [0,255], and the components of color data are converted into the floating point values (d,e,f) using the following equations: d=R/255.0, e=G/255.0, and f=B/255.0, such that the floating point values (d,e,f) are on [0,1].

In a second embodiment of the first set, the components (A, R, G, B) are signed integers on [−128,127], and the components of color data are converted into the floating point values (d,e,f) using the following equations d=R/128.0, e=G/128.0, and f=B/128.0, such that the floating point values (d,e,f) are on [−1,1).

In a third embodiment of the first set, the components (A, R, G, B) are signed integers on [−128,127], and the components of color data are converted into the floating point values (d,e,f) using the following equations d=R/127.0, e=G/127.0, and f=B/127.0, such that the floating point values (d,e,f) are on [−128/127, 1.0].

In a fourth embodiment of the first set, the components (A, R, G, B) are signed integers on [−128,127], and the components of color data are converted into the floating point values (d,e,f) using the following equations d=(R+0.5)/127.5, e=(G+0.5)/127.5, and f=(B+0.5)/127.5, such that the floating point values (d,e,f) are on [−1, 1].

In a second set of embodiments of the present invention, the components include two (2) components (H, L) each sixteen (16) bits in length. In a first embodiment of the second set, the components (H, L) are unsigned integers on [0,65535], and the components of color data are converted into the floating point values (d,e,f) using the following equations d=H/65535.0, e=L/65535.0, and f=1.0, such that the floating point values (d,e,f) are on [0.0, 1.0].

In a second embodiment of the second set, the components (H, L) are signed integers on [−32768, 32767], and the components of color data are converted into the floating point values (d,e,f) using the following equations d=H/132768.0, e=L/32768.0, and f=square root(1.0−H*H−L*L).

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which:

Prior Art

Prior Art

Prior Art

FIG. 6 illustrates a flow diagram depicting the manner in which the shading calculations are interweaved with the texture fetch operations in a plurality of iterations in accordance with one embodiment of the present invention;

DESCRIPTION OF THE PREFERRED EMBODIMENTS

Figure 1:
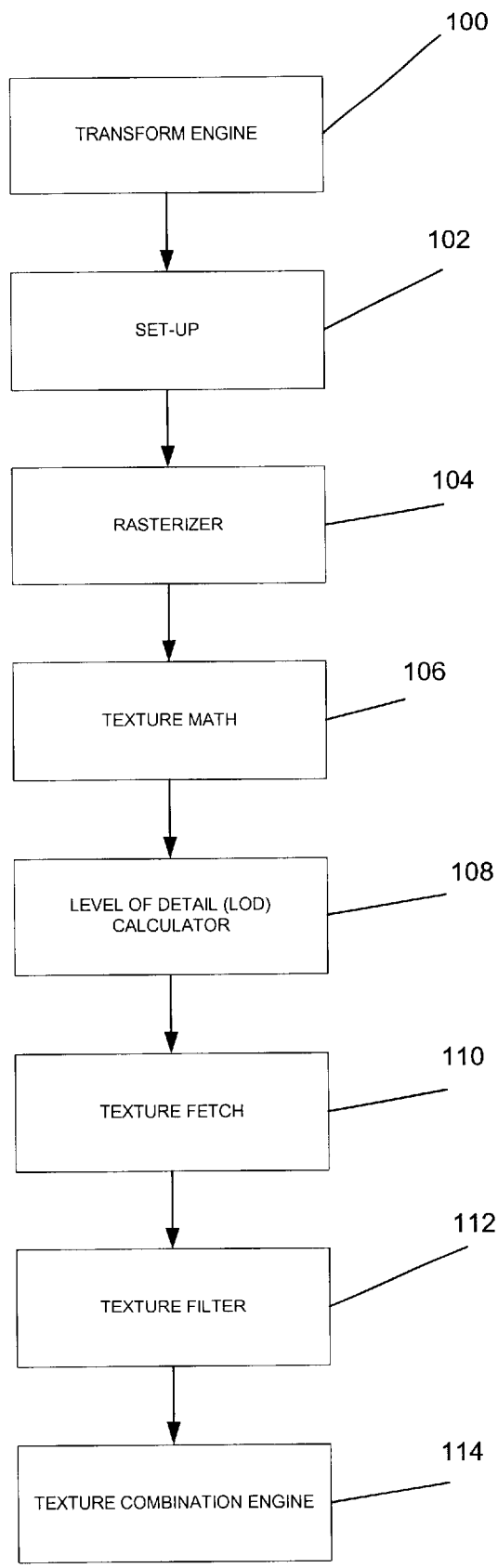
FIG. 1 illustrates a graphics pipeline with which texture mapping may be performed.
Figure 2:
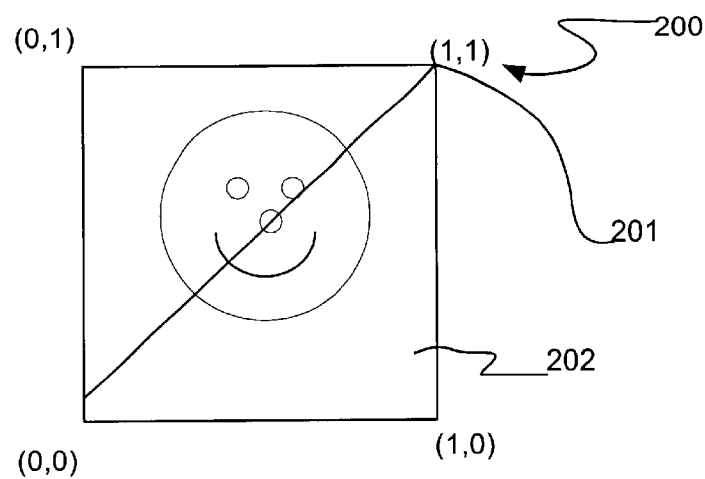
FIG. 2 illustrates the coordinates of the vertices which define a triangle.
Figure 3:
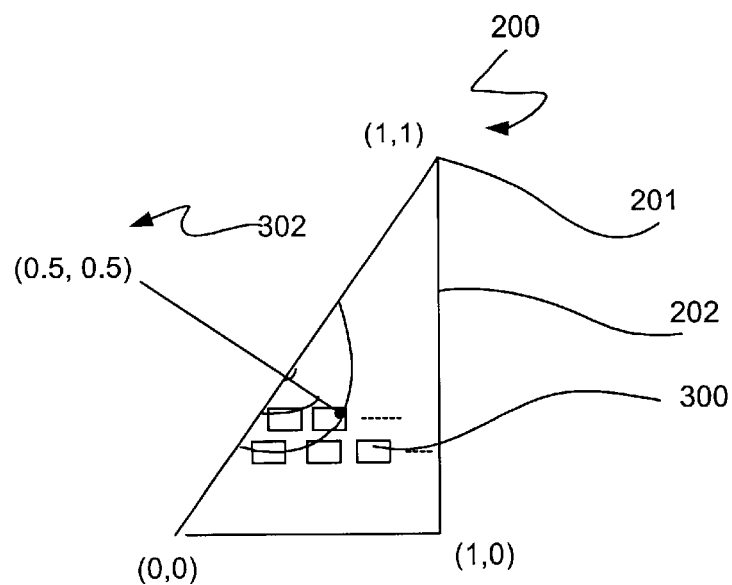
FIG. 3 illustrates a plurality of pixels identified within the triangle of FIG. 2.
Figure 4:
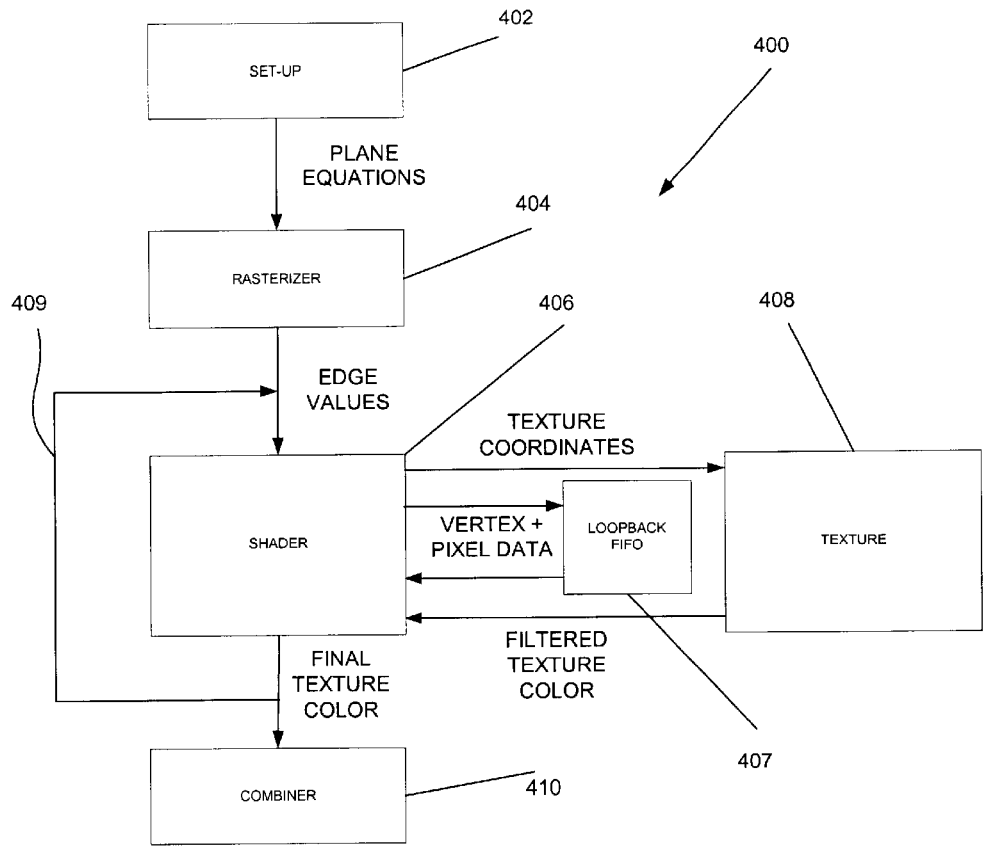
FIG. 4 illustrates a hardware implementation for programmable shading in accordance with one embodiment of the present invention.

FIGS. 1–3 illustrate the prior art. FIG. 4 shows an illustrative hardware implementation of the present invention. As shown, included is a set-up module 402, a rasterizer 404, a shader module 406, a texture fetch module 408, and a combiner 410 coupled to form a portion of a graphics processing pipeline 400. For reasons that will soon become apparent, a feedback loop 409 is coupled between an output of the shader module 406 to an input thereof. It should be noted that the set-up module 402, rasterizer 404, and combiner 410 operate in a conventional manner as set forth during reference to FIG. 1. While the combiner 410 may be implemented in any desired manner, one exemplary implementation is disclosed in a co-pending application entitled "GRAPHICS PIPELINE INCLUDING COMBINER STAGES" tiled Mar. 22, 1999 naming David B. Kirk, Matthew Papakipos, Shaun Ho, Walter Donovan, and Curtis Priem as inventors, and issued as U.S. Pat. No. : 6,333,744, and which is incorporated herein by reference in its entirety.

With continuing reference to FIG. 4, the various inputs and outputs are shown for each of the components. As shown, the rasterizer 404 generates edge distances which are used by the shader module 406 and texture fetch module 408.

Also shown in FIG. 4 is an optional feedback first-in first-out (FIFO) buffer. When the feedback loop 409 is not utilized, the temporary data calculated internally by the present invention may be dropped before being sent to the texture fetch module 408.

As an option, however, the shader module 406 may be reused, and some of this data (like the barycentric coordinates) may be reused each time a particular group of pixels, or "quad," goes through the shader module 406. If new colors are generated during one pass, these colors may continuously be associated with the quad on subsequent passes. Further, more than one triangle may be processed at a time while employing the feedback loop 409, since data from several triangles generally appears while waiting for the texture fetch module 408 to calculate an individual texture look-up.

To address this, the loopback FIFO 407 may be utilized to hold barycentric weights, colors from previous passes, triangle information, and additional scheduling information to keep track of what the shader module 406 is supposed to do each pass. The FIFO 407 may include a plurality of bits that can be reconfigured to store whatever piece of data is appropriate. When the texture requests for a particular quad are sent to the texture fetch module 408, the associated data may also be placed in the FIFO 407. When the texture requests complete, the results may be combined with the data from the FIFO 407, and a small portion of logic may decide whether to send the completed quad to the combiner 410, or back around for another pass at the shader module 406.

Figure 5:
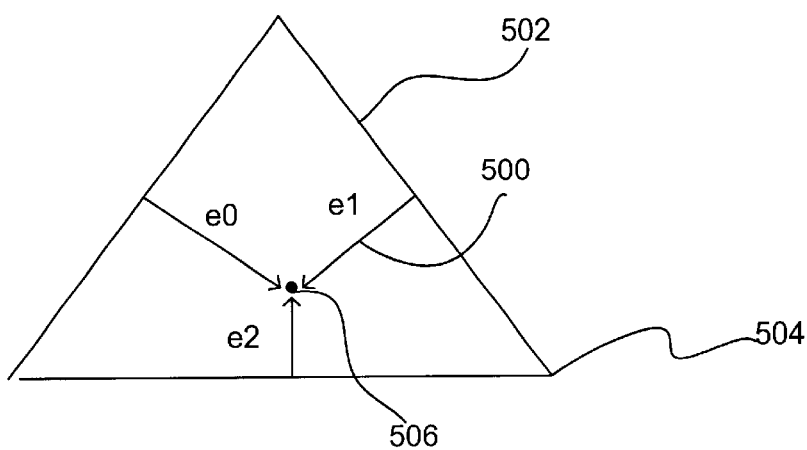
FIG. 5 illustrates a graphical representation of the edge distances generated by the rasterizer in accordance with one embodiment of the present invention.

FIG. 5 illustrates a graphical representation of the edge distances generated by the rasterizer 404. As shown, the edge distances ($e_0$, $e_1$, $e_2$) represent a perpendicular distance 500 from an edge 502 of a primitive 504 to a pixel 506 within the primitive 504. Such edge distances ($e_0$, $e_1$, $e_2$) thus identify the location of the pixel 506 within the primitive 504.

As a function of the shading calculations, various texture look-up operations may be carried out utilizing the texture look-up module 408 in order to obtain output having appropriate texture map colors. To accomplish this, texture coordinates may be sent to the texture look-up module 408. In response thereto, texture information is received from the texture look-up module 408. Such texture information may take any form including, but not limited to filtered texture color, etc.

During the course of use, the feedback loop 409 may be used for performing another shading calculation using the texture information from the texture look-up module 408 in order to generate further output. As an option, the texture information may include filtered texture look-up values for use in retrieving further texture information when the texture information retrieval operation is repeated. The present invention thus allows repeated texture information retrieval and shading calculations in an iterative, programmable manner. In other words, each iteration may be programmed to do a desired shading calculation with or without a texture look-up, where each subsequent iteration may use results of previous texture look-ups for generating further results.

In one embodiment of the present invention, at least a pair of texture look-up modules is coupled to a pair of shading modules which together constitute at least four logical modules. Further, the system may be capable of performing both interpolation and shading calculations including pre-texture shading calculations and post-texture shading calculations FIG. 6 illustrates a flow diagram depicting the manner in which the shading calculations are interweaved with the texture fetch operations in a plurality of iterations 600. As shown, each iteration 600 includes a shading calculation 602. During each shading calculation 602, a decision 604 may be made as to whether a texture look-up may be performed. If so, texture information may be retrieved during a texture look-up operation 605. Also during each iteration 600, another decision 606 is made as to whether an additional shading operation 602 is to be executed.

If it is determined in decision 606 that an additional shading operation 602 is to be performed, another iteration 600 is executed. On the other hand, if no further shading operations are to be executed, the process of FIG. 6 may be terminated. During use, the number of iterations may vary per the desires of the user.

As such, decision 604 allows additional texture information to be retrieved in subsequent shading calculations 600 based on previously retrieved texture information. It should be also noted that this may be done on different texture maps. In the alternative, it may be decided in decision 604 to not do a texture look-up, and merely perform a shading calculation 600 during a current iteration.

As mentioned earlier during reference to FIG. 4, the shading module 406 may carry out many various types of operations in order to produce output of various types based on the edge distances ($e_0$, $e_1$, $e_2$) generated by the rasterizer 404. Such output may include, but are not limited to diffuse output colors, fog output values, specular output colors, depth output values, texture color output values, a level of detail (LOD) value, and/or a Z-slope value. As an option, the calculation of a level of detail (LOD) may be performed based on the texture information that is previously retrieved.

In one embodiment, the LOD is calculated numerically. For example, the LOD may be calculated in the manner set forth in a co-pending application entitled "SYSTEM, METHOD AND ARTICLE OF MANUFACTURE FOR CALCULATING A LEVEL OF DETAIL (LOD) DURING COMPUTER GRAPHICS PROCESSING" filed Mar. 24, 2000 under application Ser. No. 09/535.045, naming Walt Donovan as inventor which is incorporated herein by reference in its entirety.

In particular, four texture coordinates ($u_0$, $u_1$, $u_2$, $u_3$) may be first identified on the texture map corresponding to four portions of a block of pixels. Such texture coordinates may be such that $u_0$ is an upper left corner of the block, $u_1$ is an upper right corner of the block, $u_2$ is a lower left corner of the block, and $u_3$ is a lower right corner of the block. In one embodiment, the block may include a 2×2 block of pixels.

Figure 6A:
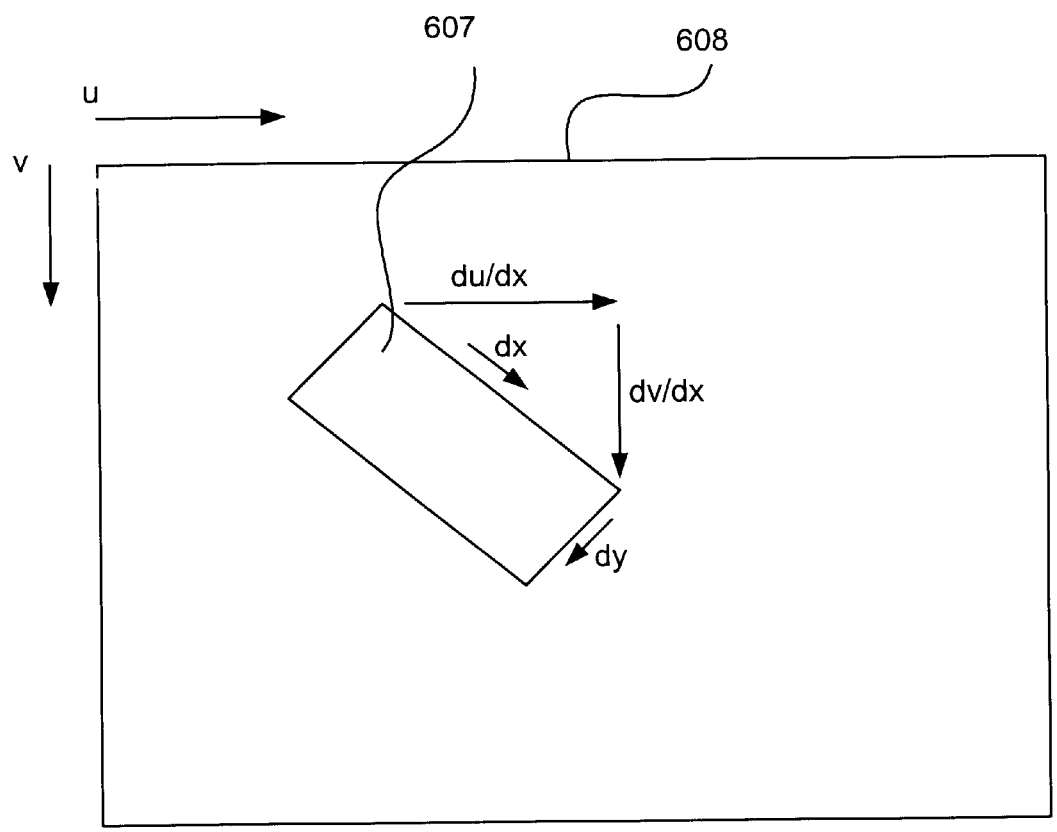
FIG. 6A graphically illustrates the derivative values, ($u_x$) and ($u_y$), with which a level of detail calculation may be performed in accordance with one embodiment of the present invention.

Thereafter, a derivative value ($u_x$), or du/dx, and ($u_y$), or du/dy, are calculated. FIG. 6A graphically illustrates the derivatives values ($u_x$) and ($u_y$). The pixel 607 is mapped in a texture coordinate space 608 with the derivatives values ($u_x$) and ($u_y$) defined as shown.

While the derivative values may be calculated in any known manner, the derivative value ($u_x$), or du/dx, and ($u_y$), or dv/dx, may be estimated using Equations #1.

$$u_x = ((u_1-u_0)+(u_3-u_2))/2$$

$$u_y((u_2-u_0)+(u_3-u_1))/2 \qquad \text{Equations \#1}$$

It should be noted that similar calculations may be made for $v_{x,y}$ and $P_{x,y}$ texture coordinates using the corresponding equations for derivatives with respect to the x and y axis. With such information, a LOD value is calculated using Equations #2.

$$\text{LOD} = \tfrac{1}{2} \log_2(\max(d_x, d_y)), \text{ where}$$

$$d_x = u_x^2 + v_x^2 + p_x^2$$

$$d_y = u_y^2 + v_y^2 + p_y^2 \qquad \text{Equations \#2}$$

Figure 7:
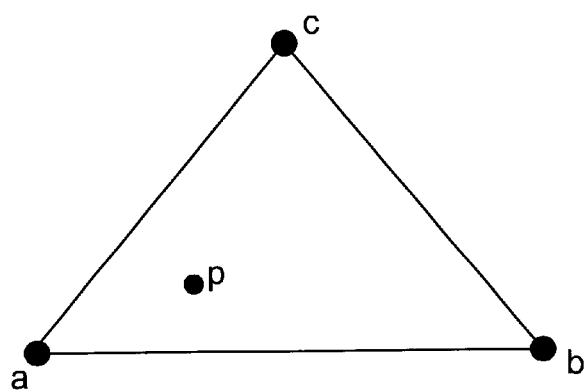
FIG. 7 illustrates a point within a primitive that is capable of being defined by barycentric weights.

In order to accomplish the foregoing shading operations set forth in FIGS. 4 and 6, perspective corrected barycentric weights ($g_0$, $g_1$, $g_2$) may be calculated from the edge distances ($e_0$, $e_1$, $e_2$). In a first embodiment, Equations #3 are utilized to calculate the perspective barycentric weights ($g_0$, $g_1$, $g_2$).

$$g0 = e0 * d$$

$$g1 = e1 * d$$

$$g2 = e2 * d, \text{ where}$$

$$s = e0 * w0 * w1 + e1 * w1 * w2 + e2 * w2 * w0$$

$$d = 1/s, \text{ where} \qquad \text{Equations \#3}$$

w0, w1 and w2 are the perspective correction factors used to perform hyperbolic or perspective corrected interpolation FIG. 7 illustrates a point within a primitive that is capable of being defined by barycentric weights ($g_0$, $g_1$, $g_2$) In particular, point (p) may be defined by Equation #4 in terms of the barycentric weights ($g_0$, $g_1$, $g_2$) and vertices (a, b, c) of the primitive. As an option, the perspective barycentric weights may use parameter values of the primitive in order to perform perspective corrected interpolation of vertex parameter values. Optionally, the perspective barycentric weights may use unclipped parameter values.

$$p = a*g_0 + b*g_1 + c*g_2 \quad \text{Equations \#4}$$

Given the perspective corrected barycentric weights ($g_0$, $g_1$, $g_2$), the various shading calculations may be performed using the equations set forth in Table 1.

TABLE 1

Z in Screen Space(depth) - Calculate screen space z values at the vertices, then interpolate them per-pixel using the edge values as non-perspective corrected weights.
zs0 = zc0 / wc0; zs1 = zc1 / wc1; zs2 = zc2 / wc2.
zs = ( e0 zs0 + e1 zs1 + e2 zs2 ) / ( e0 + e1 + e2 )
Fog - Interpolate the fog range (may be affine xform of z eye, or distance from eye point -- both computed per vertex).
Call fog range from xform fr.
fr = g0*fr0 + g1*fr1 + g2*fr2
then retrieve frac(fr) and run it through either:
    1) no table
    2) exp table
    3) exp^2 table
Note: This table could be implemented as a texture map lookup. This would allow one to do an Opengl fog table.
4 (or any other number of) Non-projective 2-D Texture Coordinates - This optimization can only be done if all q's are one. Otherwise, the 2 projective case below is performed.
s = g0*s0 + g1*s1 + g2*s2
t = g0*t0 + g1*t1 + g2*t2
2-D Projective or Cube Texture Coordinates
2-D:
sq = g0*s0 + g1*s1 + g2*s2
tq = g0*t0 + g1*t1 + g2*t2
q = g0*q0 + g1*q1 + g2*q2, where
qi = 1/q
s = sq*qi
t = tq*qi
Cube:
sr = g0*s0 + g1*s1 + g2*s2
tr = g0*t0 + g1*t1 + g2*t2
rr = g0*r0 + g1*r1 + g2*r2
f = pickmax(s,t,r)
Note: f is a face index beginning at zero (for s). Pick is a function that chooses the fth entry from the list passed to it, where f is first parameter.
sr = pick(f,tr,rr,sr)
tr = pick(f,rr,sr,tr)
r = pick(f,sr,tr,rr), where
ri = 1/r
s = sr*ri
t = tr*ri
3-D projective textures -
sq = g0*s0 + g1*s1 + g2*s2
tq = g0*t0 + g1*t1 + g2*t2
rq = g0*r0 + g1*r1 + g2*r2
q = g0*q0 + g1*q1 + g2*q2, where
qi = 1/q
s = sq*qi
t = tq*qi
r = rq*qi
2-D dependent texture lookup -- After the first texture lookup, two components of the argb color are reinterpreted as texture coordinates, and looked up again.
Dx6 Bump Mapping - After the first texture look- up, color r0,g0,b0 is received which is multiplied by 2x2 basis matrix, which is constant. s1 and t1 are the interpolated texcoords for the second look-up.
s1p = m11*r0 + m12*g0 + s1
t1p = m21*r0 + m22*g0 + t1
After the second texture lookup, received is r1,g1,b1,a1.
f = (b0*m31 + m32)
r1p = r1*f
g1p = b1*f
b1p = b1*f
a1p = a1
Polygon Offset - let the notation z(1,0) indicate the z value of the pixel in the bottom right corner of the pixel block, or quad. z(0,1) would be the top left. compute the z slopes:
zx0 = z(1,0) - z(0,0)

TABLE 1-continued zy0 = z(0,1) - z(0,0)
factor = max(abs(zx0),abs(zy0))
compute a new z:
zo = z + factor*zs + units, where factor and units are state. Loaded with pipelined state bundles.
Dot Product-based texture mapping - Using s0, t0, a first texture look-up is performed. Call the results a0 b0 c0. Dot products are taken between these values and the subsequent texture coordinates to generate a new set of texture coordinates for a subsequent texture lookup:
sp = s1 * a0 + t1 * b0 + r1 * c0
tp = s2 * a0 + t2 * b0 + r2 * c0
2-D texture lookup performed using (sp, tp).
or
sp = s1 * a0 + t1 * b0 + r1 * c0
tp = s2 * a0 + t2 * b0 + r2 * c0
rp = s3 * a0 + t3 * b0 + r3 * c0
3-D texture lookup performed using (sp, tp, rp)
or
Cube Texture coordinates performed (as above) using (sp, tp, rp)
Reflective Bump Mapping - Using s0, t0, a first texture look-up is performed. Call the results hs,ht,hr. this is the normal in tangent space.
interpolate s1, t1, r1. -- this is the surface tangent vector in eye space
interpolate s2, t2, r2 -- this is the surface binormal vector.
interpolate s3, t3, r3 -- this is the surface normal vector.
These are used as a basis matrix by which to multiply the vector hs,ht,hr. This will give the normal in eye space.
so,
nx = s1*hs + s2*ht + s3*hr;
ny = t1*hs + t2*ht + t3*hr;
nz = r1*hs + r2*ht + r3*hr;
Use the (nx,ny,nz) vector as a cube map lookup for the diffuse lighting component.
Now compute the reflection vector per pixel.
let ne = nx*ex+ny*ey+nz*ez;
let n2 = nx*nx + ny*ny + nz*nz;
rx = 2*nx*ne/n2 - ex;
ry = 2*ny*ne/n2 - ey;
rz = 2*nz*ne/n2 - ez;
Use this reflection vector as a cube map lookup.
Depth Texture Mapping with Dot Products - Using s0, t0, a first texture look-up is performed. Call the results a0, b0, c0. Dot products are performed between these values and two subsequent sets of texture coordinates to produce z clip and w clip values. These quotient of these values replaces the previously calculated z screen value.
zc = a0 * s1 + b0 * t1 + c0 * r1;
wc = a0 * s2 + b0 * t2 + c0 * r2;
zs = zc / wc
Pixel culling - The s, t, r, and q coordinates for a particular texture are interpolated per-pixel. Each coordinate is individually configured to check for either negative or non-negative values. If the texture coordinate matches the configuration, the pixel is culled (not drawn).
Isotropic BRDF- The results of two texture coordinate lookups are interpreted as 16-bit numbers, h0, l0 and h1, l1. A third texture lookup is performed using (h0, h1, l0−l1).
In order to combine a color with a set of (r,g,b) coordinates using a dot product, the color should be converted into three floating point numbers (d,e,f). This may be accomplished in several different ways, selectable by the application, to convert the 32-bit ARGB value into three such numbers. Some of such methods are as follows:
  1. Separate the 32-bit word into four 8-bit components A, R, G, and B. Each of R, G, and B will be unsigned integers on [0,255]. Convert them to floating point values on [0,1] by specifying:
    d = R / 255.0; e = G / 255.0; f = B / 255.0.
  2. Separate the 32-bit word into four 8-bit components A, R, G, and B. Each of R, G, and B will be signed integers on [−128,127]. Convert them to floating point values on [−1,1] by specifying: d = R / 128.0; e = G / 128.0; f = B / 128.0.
  3. Separate the 32-bit word into four 8-bit components A, R, G, and B. Each of R, G, and B will be signed integers on [−128,127]. Convert them to floating point values on [−128/127,1.0] by specifying: d = R / 127.0; e = G / 127.0; f = B / 127.0.
  4. Separate the 32-bit word into four 8-bit components A, R, G, and B. Each of R, G, and B will be signed integers on [−128,127]. Convert them to floating point values on [−1,1] by specifying: d = (R+0.5) / 127.5; e = (G+05) / 127.5; f = (B+.5) / 127.5.

TABLE 1-continued

5. Separate the 32-bit word into two 16-bit components, H and L. Each of H and L will be unsigned integers on [0,65535]. Convert them to floating point values on [0.0,1.0] by specifying: d = H / 65535.0; e = L / 65535.0; f = 1.0.
6. Separate the 32-bit word into two 16-bit components, H and L. Each of H and L will be signed integers on [−32768,32767]. Use these values as two of the three indices into a unit hemisphere, and construct the third by using: d = H / 32768.0; e = L / 32768.0; f = the square root of( 1.0 − H * H − L * L).

Then one can refer to the other side of the dot product as (d,e,f) throughout.

It should be understood that each of the options set forth in the foregoing tables may be adapted to reuse common portions of the hardware set forth in FIG. 4. As set forth earlier, such hardware is capable of interpolating and performing texture address calculations during general operation.

Table 1 is based on perspective corrected barycentric weights ($g_0$, $g_1$, $g_2$). In another embodiment, non-perspective corrected barycentric weights ($g_0$, $g_1$, $g_2$) may be utilized which are defined in Equations #5. Non-perspective corrected barycentric weights replace perspective correct weights when texture coordinates, colors, depth, or fog are being interpolated.

$g0 = e0*d$ $g1 = e1*d$ $g2 = e2*d$, where $s = e0 + e1 + e2$ $d = 1/s$          Equations #5

Figure 8:
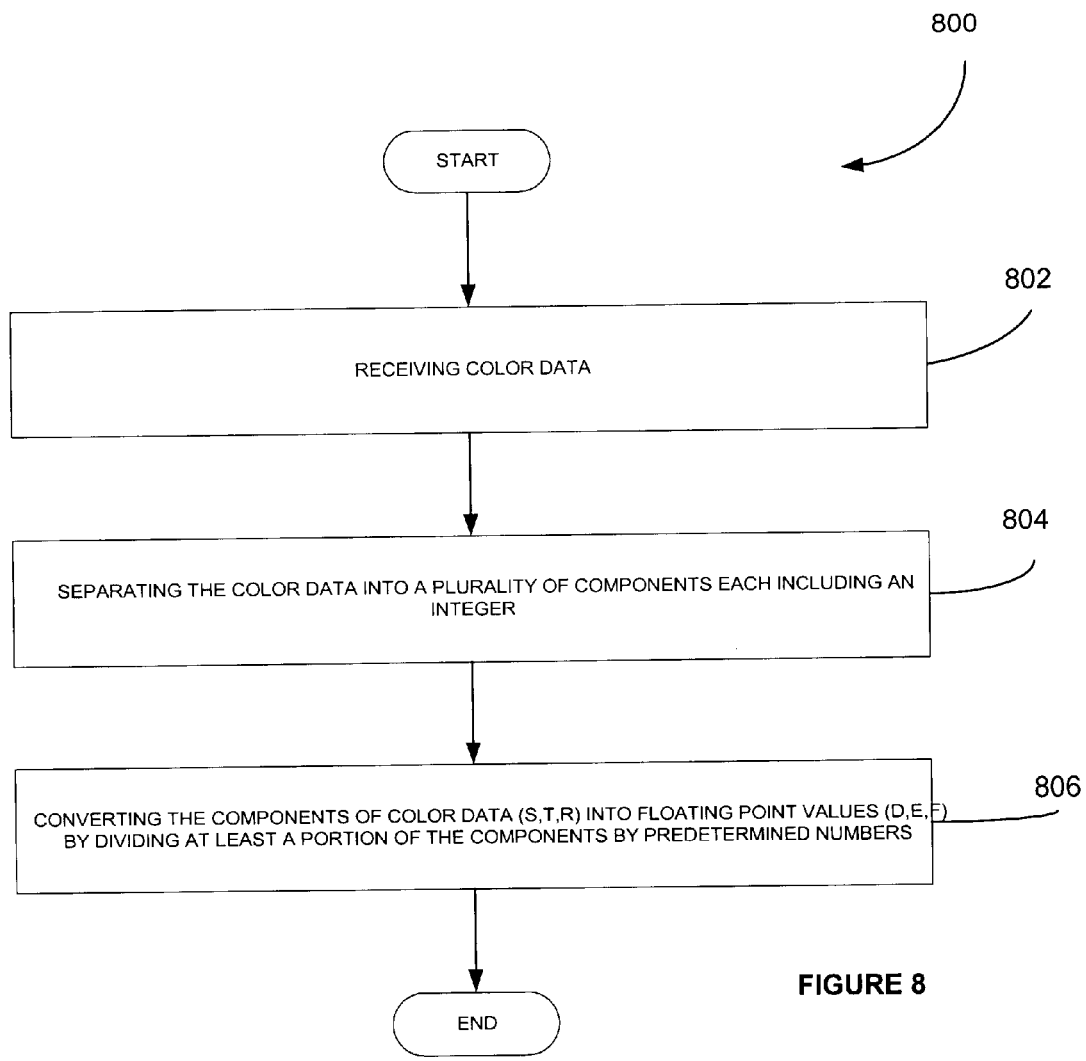
FIG. 8 illustrates a generalized method of converting color data into the floating point values (d,e,f) in a graphics pipeline.

FIG. 8 illustrates a generalized method 800 of converting color data into the floating point values in a graphics pipeline so that the color data may be combined with coordinates (r,g,b) using a dot product, as set forth in Table 1. First, in operation 802, color data is received. In one embodiment, the color data is thirty-two (32) bits in length.

Next, the color data is separated into a plurality of components each including an integer. See operation 804. The components of color data are then converted into the floating point values by dividing at least a portion of the components by predetermined numbers, as indicated in operation 806. The components, i.e. (d,e,f), may then be combined with the coordinates (r,g,b) using a dot product, in accordance with the present invention.

In one set of embodiments of the present invention, the components include four (4) components (A, R, G, B) each eight (8) bits in length. In a first embodiment of the first set, the components (A, R, G, B) are unsigned integers on [0,255], and three of the four components of color data are converted into the floating point values (d,e,f) using the following equations: d=R/255.0, e=G/255.0, and f=B/255.0, such that the floating point values (d,e,f) are on [0,1]. See Table 1.

In a second embodiment of the first set, the components (A, R, G, B) are signed integers on [−128,127], and the components of color data are converted into the floating point values (d,e,f) using the following equations d=R/128.0, e=G/128.0, and f=B/128.0, such that the floating point values (d,e,f) are on [−1,1). See Table 1.

In a third embodiment of the first set, the components (A, R, G, B) are signed integers on [−128,127], and the components of color data are converted into floating point values (d,e,f) using the following equations d=R/127.0, e=G/127.0, and f=B/127.0, such that the floating point values (d,e,f) are on [−128/127, 1.0]. See Table 1.

In a fourth embodiment of the first set, the components (A, R, G, B) are signed integers on [−128,127], and the components of color data are converted into the floating point values (d,e,f) using the following equations d=(R+0.5)/127.5, e=(G+0.5)/127.5, and f=(B+0.5)/127.5, such that the floating point values (d,e,f) are on [−1, 1]. See Table 1.

In a second set of embodiments of the present invention, the components include two (2) components (H, L) each sixteen (16) bits in length. In a first embodiment of the second set, the components (H, L) are unsigned integers on [0,65535], and the components of color data are converted into the floating point values (d,e,f) using the following equations d=H/65535.0, e=L/65535.0, and f=1.0, such that the floating point values (d,e,f) are on [0.0, 1.0]. See Table 1.

In a second embodiment of the second set, the components (H, L) are signed integers on [−32768, 32767], and the components of color data are converted into the floating point values (d,e,f) using the following equations d=H/32768.0, e=L/32768.0, and f=square root(1.0−H*H−L*L). See Table 1.

The second embodiment of the second set is particularly useful for reconstructing a vector on a unit hemisphere. Because the third floating point value (f) is square root(1.0−H*H−L*L), the length of the vector is 1.0. This provides a compact, relatively high-resolution description of a unit vector on a hemisphere. Such vectors are useful for specifying directions pointing away from a surface. Such vectors are particularly useful for specifying a high accuracy bump map.

It should be noted that the "A" component does not necessarily have to be utilized in certain cases, since it is not always needed. In one embodiment, only three values need to be generated for a dot product. If mapping 8-bit components into floating point values, the three (R,G,B) components may be sufficient. There is no need to use the "A" component.

One reason to use the foregoing combination of bit widths is because existing texture hardware can already deal with 8 and 16-bit components. If one tried to use other sizes (like an 11-11-10 combination, for example), such texture hardware would have to be modified to deal with the new size. By using already existing sizes, additional texture sampling changes may be avoided.

Table 2 illustrates examples of the method of FIG. 8 where a texture value is filtered, resulting in a color (in hexadecimal) of 0xff80007f. (A prefix of "0x" is a standard convention for denoting a hexadecimal integer.) The examples of Table 2 correspond to the six embodiments set forth hereinabove:

TABLE 2

1. Unsigned 8-bit. R = 0x80 = 128; G = 0x00 = 0; B = 0x7f = 127. The resulting (d,e,f) = (128.0/255.0, 0.0, 127.0/255.0) .
2. Signed 8-bit / 128. R = 0x80 = −128; G = 0x00 = 0; B = 0x7f = 127. The resulting (d,e,f) = (−1.0, 0.0, 127.0/128.0) .
3. Signed 8-bit / 127. R = 0x80 = −128; G = 0x00 = 0; B = 0x7f = 127. The resulting (d,e,f) = (−128.0/127.0, 0.0, 1.0) .
4. Signed 8-bit + .5 / 127.5. R = 0x80 = −128; G = 0x00 = 0; B = 0x7f = 127. The resulting d,e,f = (−1.0, 1/255.0, 1.0) .
5. Unsigned 16-bit. H = 0xff80 = 65408; L = 0x007f = 127. The resulting (d,e,f) = ( 65408.0/65535.0, 127.0/65535.0, 1.0) .
6. Signed 16-bit. H = 0xff80 = −128; L = 0x007f = 127. The resulting (d,e,f) = (−128/32768.0, 127.0/32768.0, sqrt( 1 − 128/32768*128/32768 − 127/32768*127/32768) ) = (−.00390625, .0038757324, .9999848598) .

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for converting color data into floating point values in a graphics processor, comprising:
   receiving color data;
   separating the color data into a plurality of components each including an integer; and
   converting the components of color data into floating point values by dividing at least a portion of the components by predetermined numbers;
   wherein the components include the components (red, green, blue) which are signed integers on [−128,127], and the components of color data are converted into the floating point values (d,e,f) using the following equations d=red/128.0, e=green/128.0, and f=blue/128.0, such that the floating point values (d,e,f) are on [−1,1);
   wherein the method is performed utilizing a programmable graphics pipeline system capable of handling components of a size selected from the group consisting of 8 bits and 16 bits, comprising: a shading module for performing a programmable shading calculation in order to generate output, and a texture look-up module coupled to the shading module for retrieving texture information using texture coordinates associated with the output, wherein another programmable shading calculation is performed by the shading module using the texture information from the texture look-up module in order to generate further output, such that the programmable graphics pipeline system performs a first shading calculation in order to generate a first output, retrieves first texture information using texture coordinates associated with the first output, performs a second shading calculation using the first texture information in order to generate a second output, retrieves second texture information using texture coordinates associated with the second output, performs a third shading calculation using the second texture information in order to generate a third output, retrieves third texture information using texture coordinates associated with the third output, and performs a fourth shading calculation using the third texture information in order to generate a fourth output.

2. A method for converting color data into floating point values in a graphics processor, comprising:
   receiving color data;
   separating the color data into a plurality of components each including an integer; and
   converting the components of color data into floating point values by dividing at least a portion of the components by predetermined numbers;
   wherein the components include the components (red, green, blue) which are signed integers on [−128,127], and the components of color data are converted into the floating point values (d,e,f) using the following equations d=red/127.0, e=green/127.0, and f=blue/127.0, such that the floating point values (d,e,f) are on [−128/127, 1.0];
   wherein the method is performed utilizing a programmable graphics pipeline system capable of handling components of a size selected from the group consisting of 8 bits and 16 bits, comprising: a shading module for performing a programmable shading calculation in order to generate output, and a texture look-up module coupled to the shading module for retrieving texture information using texture coordinates associated with the output, wherein another programmable shading calculation is performed by the shading module using the texture information from the texture look-up module in order to generate further output, such that the programmable graphics pipeline system performs a first shading calculation in order to generate a first output, retrieves first texture information using texture coordinates associated with the first output, performs a second shading calculation using the first texture information in order to generate a second output, retrieves second texture information using texture coordinates associated with the second output, performs a third shading calculation using the second texture information in order to generate a third output, retrieves third texture information using texture coordinates associated with the third output, and performs a fourth shading calculation using the third texture information in order to generate a fourth output.

3. A method for converting color data into floating point values in a graphics processor, comprising:
   receiving color data;
   separating the color data into a plurality of components each including an integer; and
   converting the components of color data into floating point values by dividing at least a portion of the components by predetermined numbers;
   wherein the components include the components (red, green, blue) which are signed integers on [−128,127], and the components of color data are converted into the floating point values (d,e,f) using the following equations d=(red+0.5)/127.5, e=(green+0.5)/127.5, and f=(blue+0.5)/127.5, such that the floating point values (d,e,f) are on [−1, 1];
   wherein the method is performed utilizing a programmable graphics pipeline system capable of handling components of a size selected from the group consisting of 8 bits and 16 bits, comprising: i shading module for performing a programmable shading calculation in order to generate output, and a texture look-up module coupled to the shading module for retrieving texture information using texture coordinates associated with the output, wherein another programmable shading calculation is performed by the shading module using the texture information from the texture look-up module in order to generate further output, such that the programmable graphics pipeline system performs a first shading calculation in order to generate a first output, retrieves first texture information using texture coordinates associated with the first output, performs a second shading calculation using the first texture information in order to generate a second output, retrieves second texture information using texture coordinates associated with the second output, performs a third shading calculation using the second texture information in order to generate a third output, retrieves third texture information using texture coordinates associated with the third output, and performs a fourth shading calculation using the third texture information in order to generate a fourth output.

4. A method for converting color data into floating point values in a graphics processor, comprising:
   receiving color data;
   separating the color data into a plurality of components each including an integer; and
   converting the components of color data into floating point values by dividing at least a portion of the components by predetermined numbers;

wherein the components include a first component and a second component are signed integers on [−32768, 32767], and the components of color data are converted into the floating point values (d,e,f) using the following equations d=(first component)/32768.0, e=(second component)/32768.0, and f=square root(1.0−(first component)*(first component)−(second component)*(second component));

wherein the method is performed utilizing a programmable graphics pipeline system capable of handling components of a size selected from the group consisting of 8 bits and 16 bits, comprising: n shading module for performing a programmable shading calculation in order to generate output, and a texture look-up module coupled to the shading module for retrieving texture information using texture coordinates associated with the output, wherein another programmable shading calculation is performed by the shading module using the texture information from the texture look-up module in order to generate further output, such that the programmable graphics pipeline system performs a first shading calculation in order to generate a first output, retrieves first texture information using texture coordinates associated with the first output, performs a second shading calculation using the first texture information in order to generate a second output, retrieves second texture information using texture coordinates associated with the second output, performs a third shading calculation using the second texture information in order to generate a third output, retrieves third texture information using texture coordinates associated with the third output, and performs a fourth shading calculation using the third texture information in order to generate a fourth output.

5. A computer program embodied on a computer readable medium for converting color data into floating point values in a graphics processor, comprising:

a code segment for receiving color data;

a code segment for separating the color data into a plurality of components each including an integer; and a code segment for converting the components of color data into floating point values by dividing at least a portion of the components by predetermined numbers;

wherein the components include four (4) components (alpha, red, green, blue) and the components are signed integers on [−128,127], and the components of color data are converted into the floating point values (d,e,f) using the following equations d=red/128.0, e=green/128.0, and f=blue/128.0, such that the floating point values (d,e,f) are on [−1,1);

wherein the code segments are executed utilizing a programmable graphics pipeline system capable of handling components of a size selected from the group consisting of 8 bits and 16 bits, comprising: a shading module for performing a programmable shading calculation in order to generate output, and a texture look-up module coupled to the shading module for retrieving texture information using texture coordinates associated with the output, wherein another programmable shading calculation is performed by the shading module using the texture information from the texture look-up module in order to generate further output, such that the programmable graphics pipeline system performs a first shading calculation in order to generate a first output, retrieves first texture information using texture coordinates associated with the first output, performs a second shading calculation using the first texture information in order to generate a second output, retrieves second texture information using texture coordinates associated with the second output, performs a third shading calculation using the second texture. information in order to generate a third output, retrieves third texture information using texture coordinates associated with the third output, and performs a fourth shading calculation using the third texture information in order to generate a fourth output.

6. A computer program embodied on a computer readable medium for converting color data into floating point values in a graphics processor, comprising:

a code segment for receiving color data;

a code segment for separating the color data into a plurality of components each including an integer; and a code segment for converting the components of color data into floating point values by dividing at least a portion of the components by predetermined numbers;

wherein the components include four (4) components (alpha, red, green, blue) and the components are signed integers on [−128, 127], and the components of color data are converted into the floating point values (d,e,f) using the following equations d=red/127.0, e=green/127.0, and f=blue/127.0, such that the floating point values (d,e,f) are on [−128/127, 1.0];

wherein the code segments are executed utilizing a programmable graphics pipeline system capable of handling components of a size selected from the group consisting of 8 bits and 16 bits, comprising: a shading module for performing a programmable shading calculation in order to generate output, and a texture look-up module coupled to the shading module for retrieving texture information using texture coordinates associated with the output, wherein another programmable shading calculation is performed by the shading module using the texture information from the texture look-up module in order to generate further output, such that the programmable graphics pipeline system performs a first shading calculation in order to generate a first output, retrieves first texture information using texture coordinates associated with the first output, performs a second shading calculation using the first texture information in order to generate a second output, retrieves second texture information using texture coordinates associated with the second output, performs a third shading calculation using the second texture information in order to generate a third output, retrieves third texture information using texture coordinates associated with the third output, and performs a fourth shading calculation using the third texture information in order to generate a fourth output.

7. A computer program embodied on a computer readable medium for converting color data into floating point values in a graphics processor, comprising:

a code segment for receiving color data;

a code segment for separating the color data into a plurality of components each including an integer; and a code segment for converting the components of color data into floating point values by dividing at least a portion of the components by predetermined numbers;

wherein the components include four (4) components (alpha, red, green, blue) and the components are signed integers on [−128,127], and the components of color data are converted into the floating point values (d,e,f) using the following equations d=(red+0.5)/127.5, e=(green+0.5)/127.5, and f=(blue+0.5)/127.5, such that the floating point values (d,e,f) are on [−1, 1];

wherein the code segments are executed utilizing a programmable graphics pipeline system capable of handling components of a size selected from the group consisting of 8 bits and 16 bits, comprising: a shading module for performing a programmable shading calculation in order to generate output, and a texture took-up module coupled to the shading module for retrieving texture information using texture coordinates associated with the output, wherein another programmable shading calculation is performed by the shading module using the texture information from the texture look-up module in order to generate further output, such that the programmable graphics pipeline system performs a first shading calculation in order to generate a first output, retrieves first texture information using texture coordinates associated with the first output, performs a second shading calculation using the first texture information in order to generate a second output, retrieves second texture information using texture coordinates associated with the second output, performs a third shading calculation using the second texture information in order to generate a third output, retrieves third texture information using texture coordinates associated with the third output, and performs a fourth shading calculation using the third texture information in order to generate a fourth output.

8. A computer program embodied on a computer readable medium for converting color data into floating point values in a graphics processor, comprising:

a code segment for receiving color data;

a code segment for separating the color data into a plurality of components each including an integer; and a code segment for converting the components of color data into floating point values by dividing at least a portion of the components by predetermined numbers;

wherein the components include a first component and a second component are signed integers on [−32768, 32767], and the components of color data are converted into the floating point values (d,e,f) using the following equations d=(first component)/32769.0, e=(second component)/32768.0, and f=square root(1.0−(first component)*(first component)−(second component)*(second component));

wherein the code segments are executed utilizing a programmable graphics pipeline system capable of handling components of a size selected from the group consisting of 8 bits and 16 bits, comprising: a shading module for performing a programmable shading calculation in order to generate output, and a texture look-up module coupled to the shading module for retrieving texture information using texture coordinates associated with the output, wherein another programmable shading calculation is performed by the shading module using the texture information from the texture look-up module in order to generate further output, such that the programmable graphics pipeline system performs a first shading calculation in order to generate a first output, retrieves first texture information using texture coordinates associated with the first output, performs a second shading calculation using the first texture information in order to generate a second output, retrieves second texture information using texture coordinates associated with the second output, performs a third shading calculation using the second texture information in order to generate a third output, retrieves third texture information using texture coordinates associated with the third output, and performs a fourth shading calculation using the third texture information in order to generate a fourth output.

9. The method as recited in claim 4, wherein a bi-directional reflectance distribution function (BRDF) is performed using the texture information in order to generate additional texture information.

10. The method as recited in claim 4, wherein a dot product is performed using the texture information in order to generate additional texture information.

11. The method as recited in claim 4, wherein a vector is reconstructed on a unit hemisphere.

12. The method as recited in claim 11, wherein the vector includes a length of 1.0.

13. The method as recited in claim 11, wherein the vector specifies a direction pointing away from a surface.

14. The method as recited in claim 11, wherein the vector specifies a bump map.

* * * * *

UNITED STATES PATENT AND TRADEMARK OFFICE
CERTIFICATE OF CORRECTION

PATENT NO.        : 6,806,886 B1                                    Page 1 of 1
APPLICATION NO.   : 09/610706
DATED             : October 19, 2004
INVENTOR(S)       : Harold Robert Feldman Zatz It is certified that error appears in the above-identified patent and that said Letters Patent is hereby corrected as shown below:

Col. 12, line 37; replace "i shading" with --a shading--;
Col. 13, line 12; replace "n shading" with --a shading--;
Col. 14, line 6; replace "texture." with --texture--;
Col. 15, line 9; replace "took-up" with --look-up--;
Col. 15, line 42; replace "32769.0" with --32768.0--.

Signed and Sealed this

Thirteenth Day of November, 2012

David J. Kappos
*Director of the United States Patent and Trademark Office*